(12) United States Patent
Kiyko

(10) Patent No.: US 9,407,057 B2
(45) Date of Patent: Aug. 2, 2016

(54) POWERFUL PULSED SELF-SEEDING $CO_2$ LASER

(71) Applicant: HyperMemo Oy, Joensuu (FI)

(72) Inventor: Vadim Kiyko, Moscow (RU)

(73) Assignee: HyperMemo Oy, Joensuu (FI)

( * ) Notice: Subject to any disclaimer, the term of this patent is extended or adjusted under 35 U.S.C. 154(b) by 0 days.

(21) Appl. No.: 14/759,517

(22) PCT Filed: Jan. 16, 2014

(86) PCT No.: PCT/FI2014/050035
§ 371 (c)(1),
(2) Date: Jul. 7, 2015

(87) PCT Pub. No.: WO2014/111626
PCT Pub. Date: Jul. 24, 2014

(65) Prior Publication Data
US 2015/0349483 A1    Dec. 3, 2015

(30) Foreign Application Priority Data

Jan. 16, 2013 (FI) ...................... 20135052

(51) Int. Cl.
*H01S 3/081* (2006.01)
*H01S 3/104* (2006.01)
(Continued)

(52) U.S. Cl.
CPC ............... *H01S 3/0818* (2013.01); *H01S 3/104* (2013.01); *H01S 3/121* (2013.01); *H01S 3/2232* (2013.01); *H01S 3/0817* (2013.01); *H01S 3/08068* (2013.01); *H01S 3/09702* (2013.01)

(58) Field of Classification Search
CPC ........ H01S 3/121; H01S 3/104; H01S 3/0818
See application file for complete search history.

(56) References Cited

U.S. PATENT DOCUMENTS

| 3,750,049 A | 7/1973 | Dowley et al. |
| 3,873,942 A | 3/1975 | Reilly |

(Continued)

FOREIGN PATENT DOCUMENTS

| JP | S61226985 A | 10/1986 |
| JP | 2001-308427 A | 11/2001 |
| WO | 2012/114172 A1 | 8/2012 |

OTHER PUBLICATIONS

Search report from priority Finnish Application No. 20135052, dated Nov. 13, 2013, 1 pg.

(Continued)

*Primary Examiner* — Dung Nguyen
(74) *Attorney, Agent, or Firm* — Chernoff, Vilhauer, McClung & Stenzel, LLP

(57) ABSTRACT

The present disclosure discloses a $CO_2$ laser and a method for the $CO_2$ laser. The $CO_2$ laser comprises an unstable laser cavity in the form of a first optical resonator having a semi-transparent output coupler (3), a laser medium (2) in the unstable laser cavity, and means (1) for exciting the laser medium (2). A part of the laser beam propagating beyond the light aperture of the output coupler (3) is directed to a second resonator, the second resonator comprising at least one focusing member (6), and the optical length of the second resonator being equal or multiple to the optical length of the first optical resonator. The part of the laser beam passing through the focal plane of the focusing member (6) is modulated by using a Q-switching device (8) in a manner that the excitation of the laser medium is in synchrony with the operation of the Q-switching device (8).

9 Claims, 2 Drawing Sheets

(51) Int. Cl.
*H01S 3/121* (2006.01)
*H01S 3/223* (2006.01)
*H01S 3/08* (2006.01)
*H01S 3/097* (2006.01)

(56) References Cited

U.S. PATENT DOCUMENTS

| | | | |
|---|---|---|---|
| 5,046,184 | A | 9/1991 | Chee et al. |
| 5,157,684 | A | 10/1992 | Benda et al. |
| 5,210,764 | A | 5/1993 | Buecher et al. |
| 7,508,850 | B2 * | 3/2009 | Newman ............ B23K 26/063 372/12 |
| 2005/0276300 | A1 | 12/2005 | Ishizu |
| 2012/0286163 | A1 * | 11/2012 | Stiens ................ G02F 1/195 250/340 |
| 2013/0169953 | A1 * | 7/2013 | Zordan ............... G01N 21/53 356/72 |
| 2014/0199858 | A1 * | 7/2014 | Hoult ................. H01L 21/268 438/795 |

OTHER PUBLICATIONS

Search report from corresponding International Application No. PCT/FI2014/050035, mailing date: Apr. 2, 2014, 4 pgs.

Written Opinion from corresponding International Application No. PCT/FI2014/050035, mailing date: Apr. 2, 2014, 8 pgs.

W Viol and J Uhlenbuschz, "Generation of CO2 laser pulses by Q-switching and cavity dumping and their amplification by a microwave excited CO2 laser", J. Phys. D: Appl. Phys. 29 (1996) pp. 57-67. Printed in the UK, 1996 IOP Publishing Ltd., Download details: IP Address: 149.171.67.164 This content was downloaded on Jul. 30, 2015 at 11:44.

Husmann, et al., "Scaling of a Q-switch CO2-laser for pulsed laser deposition", Part of the SP1E Conference on High-Power Laser Ablation • Santa Fe. New Mexico • Apr. 1998, SPIE vol. 3343. 0277-786X/98, pp. 759-768, Downloaded From: http://proceedings.spiedigitallibrary.org/ on Jul. 30, 2015.

* cited by examiner

POWERFUL PULSED SELF-SEEDING $CO_2$ LASER

CROSS-REFERENCE TO RELATED APPLICATIONS

This is a national stage application filed under 35 USC 371 based on International Application No. PCT/FI2014/050035 filed Jan. 16, 2014 and claims priority under 35 USC 119 of Finnish Patent Application No. 20135052 filed Jan. 16, 2013.

STATEMENT REGARDING FEDERALLY SPONSORED RESEARCH OR DEVELOPMENT.

Not Applicable.

THE NAMES OF THE PARTIES TO A JOINT RESEARCH AGREEMENT.

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB).

Not Applicable.

STATEMENT REGARDING PRIOR DISCLOSURES BY THE INVENTOR OR A JOINT INVENTOR.

Not Applicable.

FIELD OF THE INVENTION

The invention relates to laser technology and, particularly, to high-power pulsed laser systems.

BACKGROUND OF THE INVENTION

Obtaining high output power of laser radiation while simultaneously having low divergence of a laser beam may be an issue when creating a laser system.

The divergence of output laser radiation is mainly determined by the properties of laser cavity. Unstable cavities may be used for producing laser beams with very low divergence. In such cavities, light photons emitted by a laser medium reach the edge of cavity aperture in a fixed number of round trips even if the light photons were emitted under insignificant angles to the optical axis. In this manner, optical aberrations possibly existing in laser medium and cavity reflectors do not have a significant influence on optical quality of the output radiation.

Unstable cavities can be characterized by a magnification field factor M which may be defined as the ratio between sizes of a linear light beam in two subsequent trips in the cavity.

A laser based on an unstable cavity may comprise an output mirror with high reflectivity. In such a laser, an output laser beam may be produced beyond the aperture of the output mirror in a form of a ring. Such form of a light beam may, however, be ill-suited for applications requiring use of light beams with a maximum axial intensity (Gaussian spatial intensity distribution or close to uniform one).

Alternatively, a laser based on unstable cavities may comprise an output coupler which is semi-transparent. A compromise between the spatial divergence of the output beam and the convenience of its practical use may be achieved in such a laser.

Laser pulses with high peak power may be obtained, for example, by a method of Q-switching, also known as giant pulse formation. This laser operation mode may consist in changing cavity losses from a high value to a low value during excitation of a laser medium inside a laser cavity.

At the high value of cavity loss factor, a laser generation threshold remains at a level that prevents the development of laser generation. At this stage, the laser medium receives excitation energy from an excitation source and accumulates the energy. When a desired level of the stored energy is reached, the cavity losses are lowered to the low value as fast as possible. The generation threshold reduces dramatically and the laser begins to generate stimulated emission in a manner that the gain significantly exceeds the losses.

As a result, a powerful laser output pulse appears where the energy of the pulse is approximately the energy stored in the laser medium up to the moment of reduction of cavity losses. Pulse duration is equal to several periods of cavity trips.

Q-switching may be implemented in various ways. A simple approach is so-called opto-mechanical technique. In this approach, a high level of losses in the cavity is achieved by placing a mechanical chopper inside the cavity. The low level of losses is obtained by removing the chopper from the path of the radiation.

When the opto-mechanical technique is used, the time required for a transition from a high-loss state to a low-loss state can be minimized by using as small size of laser beam as possible in the plane of mechanical chopper position.

In order to minimize the laser beam size in the plane of mechanical chopper position, focusing properties of additional intracavity components or concave cavity mirrors may be used (see <<Scaling of a Q-switch CO2 laser for pulsed laser deposition>>, Proc. SPIE, Vol. 3343, 1998, pp.759-768).

For lasers with low pulse energy, the intracavity focusing of the radiction may be quite acceptable. However, in high-power laser systems, this may lead to undesirable effects, such as an optical breakdown. Duration of the pulse generation in Q-switched lasers can range from a few nanoseconds to a few hundred nanoseconds. Thus, the duration of the pulse generation may be much shorter than the time taken by mechanical means to reduce intracavity losses (few microseconds). The emission may reach its peak power while the mechanical chopper is still on the line of propagation of the emitted radiation. As a result, the mechanical chopper may be damaged by the emission.

Q-switching may also be performed, for example, by electro-optical technique. This type of Q-switching may be implemented by an optical element in which transmission depends on the electrical voltage applied to the element.

Implementation of electro-optical Q-switch technique into a high-power laser system may also be problematic as the electro-optical crystals generally have much lower optical breakdown threshold than other non-crystal intracavity components. For example, U.S. Pat. No. 4,498,179 discloses a pulsed laser comprising a laser medium placed in main cavity which output mirror is semi-transparent, an additional resonator optically coupled with said main cavity, electro-optical Q-switch inside said additional resonator, and a Q-switch control unit. The laser has a low output power of radiation because of the electro-optical modulator used.

A possible approach for creating a laser system that generates powerful pulses is a combination of low-power pulsed laser and an amplifier (<<Generation of $CO_2$ laser pulses by Q-switching and cavity dumping and their amplification by a microwave excited $CO_2$ laser>>, J. Phys. D: Appl. Phys. 29, 1996, pp.57-67). In such a system, a Q-switched laser generates a short pulse of low energy which is then used as an input pulse of the amplifier. As the input pulse passes once or more through the gain medium of amplifier, radiation reaches the required level of energy. In practice, however, laser systems comprising amplifiers may be complex and cumbersome. They may require use of additional synchronization systems which may lead to high costs and reduced efficiency.

Effective modulation of radiation in a main laser cavity can be provided either by placing a modulator inside the cavity, or by using an external radiation source for seeding modulated radiation into the main cavity which then plays a role of a multi-pass amplifier.

In the case of a modulator inside the laser cavity, requirements for Q-switching may be determined by the relation between the modulation depth and the lifetime of a photon in the cavity. In lasers where modulators with low modulation depth are used, generation of high-contrast pulses may be achieved only with low cavity losses. If the cavity losses are higher (and laser medium has high gain), the modulation depth may have to be increased as photons may have time to make only few round trips before leaving the cavity. Because of the low optical breakdown threshold of intracavity modulators, it may be difficult to simultaneously achieve a high peak power and a high average power of the laser radiation.

In the case of an external radiation source, the above restriction can be avoided but achieving high-contrast modulation of the radiation in the main cavity may become an issue. If an external modulated modulation seeding radiation is injected into a main cavity in which the conditions of self-excitation have already been reached and stimulated emission takes place independently of the seeding radiation, depth of the modulation of the output radiation in the main cavity depends on the power ratio between the seeding light and the self-excited emission. Thus, if the power of the seeding radiation is insufficient, the seeding radiation may not be able to impose its modulation to the emission of the main cavity. On the other hand, if the power of the modulated seeding radiation is significantly increased, the problems related to high power modulation as described above may arise.

BRIEF SUMMARY OF THE INVENTION

An object of the present invention is to provide a method and an apparatus for implementing the method so as to alleviate the above disadvantages. The objects of the invention are achieved by a method and an arrangement which are characterized by what is stated in the independent claims. The preferred embodiments of the invention are disclosed in the dependent claims.

A self-seeding $CO_2$ laser can be based on a new construction and optical layout where the laser comprises, a laser medium placed in a main laser cavity having a semi-transparent output coupler, means for laser medium excitation, and a second resonator optically coupled with the laser cavity.

The laser cavity is configured unstable. The output coupler may have an aperture less than the diameter of output laser beam, and the resonator may be optically coupled with the unstable laser cavity beyond the aperture of the output coupler.

The second resonator may be defined by at least two mirrors coupled and may comprise at least one focusing member. The optical length of the resonator may be equal or multiple to the optical length of said laser cavity.

The laser further comprises a Q-switching device. The Q-switching device may be implemented as a chopper placed in the focal plane of the focusing member of the resonator. A control unit for the Q-switching device may be electrically connected to the means for laser medium excitation. The control may synchronize operation of the means for exciting the laser medium with operation of the Q-switching device.

By using the disclosed construction and optical layout, it is possible to produce high contrast laser pulses of high peak power at high average output power.

BRIEF DESCRIPTION OF THE SEVERAL VIEWS OF THE DRAWINGS

In the following the invention will be described in greater detail by means of preferred embodiments with reference to the attached drawings, in which.

DETAILED DESCRIPTION OF THE INVENTION

Figure 1:
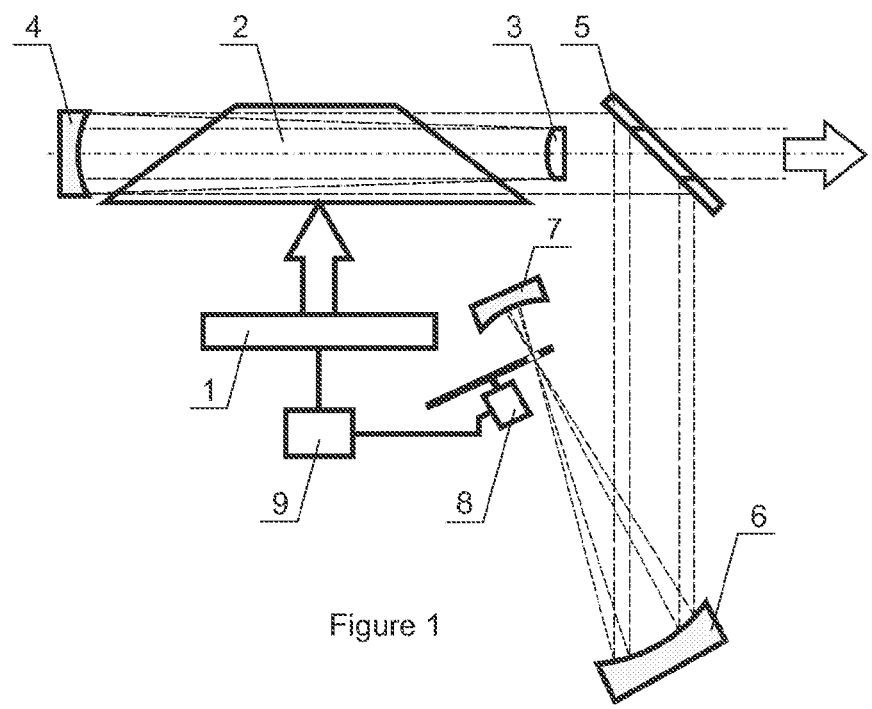
FIG. 1 shows a schematic layout of an exemplary $CO_2$ laser comprising stigmatic focusing elements in the second resonator.

The present disclosure discloses a method for a $CO_2$ laser comprising an unstable laser cavity, a laser medium, such as a laser chamber filled with CO2 lasing gas mix, in the laser cavity, and means for exciting the laser medium. The unstable laser cavity may be in the form of a first optical resonator having a semi-transparent output coupler. The unstable laser cavity can be made, for example, in telescopic layout. In the laser cavity, a laser beam may be produced by exciting a laser medium.

The diameter of the aperture of the output coupler may be less than the diameter of a laser beam generated in the unstable laser cavity. The output coupler may be configured to divide the generated laser beam into a first part that follows a path passing through the aperture of the output coupler and a second part that follows a path passing by the aperture of the output coupler.

In order to be able to modulate the generated laser beam, a second resonator may be optically coupled with the first optical resonator beyond the light aperture of the output coupler. In other words, the part of the laser beam propagating beyond of the light aperture of the output coupler, i.e. the second part of the laser beam, may be directed to the second resonator. The second resonator is used to modulate the part of the beam directed to it. The modulated part of the laser beam may then be injected back to the unstable laser cavity.

An effective (100%) modulation of intense radiation can be achieved when the amount of radiation injected in the first optical resonator is at least 20% of the total output power of the laser. A condition of 20% of total power results in a magnification field factor M of the unstable laser cavity greater than $\sqrt{1,2}\approx1,1$.

The second optical resonator may be defined by at least two mirrors. The second resonator may be optically coupled with the unstable laser cavity by using a first mirror having a hole in its aperture. The first mirror may be configured to reflect the second part, i.e. the part follows a path passing by the aperture, of the laser beam.

Condition of phase conjugation between seeding radiation and intracavity wave is an important aspect of the disclosed laser. If the condition of phase conjugation cannot be reached, the optical quality of output laser beam may decrease and generation threshold increase. In order to ensure presence of the condition, the optical length of the second resonator may be equal or multiple to the optical length of the first optical resonator.

The second resonator may comprise at least one focusing member. The focusing member may be stigmatic or astigmatic. The part of laser beam passing through the focal plane of the focusing member may be modulated by using a Q-switching device in a manner that the excitation of the laser medium is in synchrony with operation of the Q-switching device. The Q-switching device may be arranged into the focal plane of said focusing member inside the second resonator. The Q-switching device may, for example, be a mechanical chopper.

The laser may comprise means for synchronizing operation of the means for exciting the laser medium with operation of the Q-switching device. These means may be electrically connected to the means for laser medium excitation.

FIG. 1 shows a schematic layout of an exemplary $CO_2$ laser comprising stigmatic focusing elements in its second resonator. In FIG. 1, the laser comprises a main laser cavity in the form of a first optical resonator defined by a semi-transparent output mirror 3 acting as the output coupler and a highly reflective rear mirror 4. In FIG. 1, a laser medium 2 is located in the main laser cavity. A pumping device 1 acts as the means for exciting the laser medium 2.

The main laser cavity is configured unstable. The diameter of the aperture of the output mirror 3 is less than the diameter of a laser beam generated in the main laser cavity. As a result, a first part of the laser beam passes through the aperture of the output mirror 3 while a second part of the laser beam passes by the aperture of the output mirror 3.

In FIG. 1, focal points of mirrors 3 and 4 coincide and the magnification field factor M can be found as follows $$M=R_4/R_3, \quad (1)$$

where $R_3$ is the radius of curvature of the output mirror 3, and $R_4$ is the radius of curvature of the mirror 4.

The laser in FIG. 1 further comprises mirrors 5, 6 and 7 that form a second optical resonator. The second optical resonator is optically coupled with the main laser cavity beyond the light aperture of the mirror 3. The optical length of the second optical resonator is equal or multiple to the optical length of the main cavity.

In FIG. 1, mirror 5 is placed on the optical axis of the main cavity and has a hole in the center of its aperture. The shape of the hole matches the shape of aperture of output mirror 3 in the direction of the optical axis of the main cavity. Mirror 5 is tilted in such a way that it reflects the part of the laser beam which passes by the aperture of the output mirror 3 beyond the light aperture of the mirror 3 and directs the beam to mirrors 6 and 7.

In FIG. 1, spherical mirrors 6 and 7 act as focusing members. Mirrors 6 and 7 are placed in such way that the focal point of the mirror 6 coincides with the center of curvature of the mirror 7.

Figure 4:
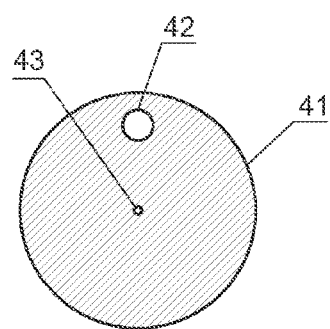
FIGS. 4 and 5 illustrate exemplary shapes of mechanical choppers.

In the second optical resonator of FIG. 1, a Q-switching device 8 has been arranged into the focal plane of mirror 6. The Q-switching device 8 is in the form of a mechanical chopper, such as shown in FIG. 4. The exemplary mechanical chopper in FIG. 4 comprises a circular chopper plate 41 with a circular opening 42 through the plate 41. During operation, the plate 41 rotates around axis 43 which is perpendicular to the plane of the plate 41.

The laser in FIG. 1 further comprises means for synchronizing operation of the means for exciting the laser medium 2 with operation of the Q-switching device 8. A control unit 9 acts as means for synchronizing in FIG. 1. The Q-switching device is electrically connected to the control unit 9 which is, in turn, electrically connected to the pumping device 1 of the laser medium 2. The control unit 9 controls the pumping device 1 on the basis of the state, such as rotational angle, of the Q-switching device 8.

The laser of FIG. 1 operates in the following manner. A laser beam is produced in the main laser cavity by exciting the laser medium 2. The pumping device 1 provides the condition of inverse population in the laser medium 2. Spontaneous emission arises in the laser medium 2 under the excitation, reflects from the mirrors 3 and 4 of the main laser cavity and results in amplified coherent laser radiation due to stimulated transitions.

As the main laser cavity is unstable and the laser beam expands M times each round trip, the first part of the beam, i.e. the peripheral part, propagates beyond the light aperture of the output mirror 3. The first part reaches the deflecting mirror 5 and reflects from it. In this manner, the first part of the beam is directed to the second resonator.

At the same time, the second part of the beam, i.e. the paraxial part of the laser beam propagating inside the main cavity within the light aperture of semi-transparent output mirror 3, partially reflects from mirror 3. The reflected part of the beam begins the following path through the main cavity. The rest of the beam passes through the mirror 3 and bypasses the deflecting mirror 5 through the hole as the diameter of the hole is equal to the diameter of the light aperture of the output mirror 3.

The radiation allotted from the main cavity by mirror 5 has the shape of a ring. This radiation is directed to the stigmatic focusing member in the form of the spherical mirror 6. The transverse size of the beam goes to minimum either in both transverse coordinates in the focal plane of the spherical mirror 6.

In the focal plane of the spherical mirror 6, the mechanical chopper of the Q-switching device 8 modulates the amplitude of the part of laser beam passing through the focal plane. The control unit 9 controls that the excitation of the laser medium 2 is in synchrony with operation of the Q-switching device 8. The control unit 9 may, for example, control the operation of the pumping device 1 on the basis of rotation of the mechanical chopper.

After passing through the mechanical chopper, the radiation reaches the spherical rear mirror 7 of the second resonator. Being reflected from the rear mirror 7, the radiation passes the Q-switching device 8 and the spherical mirror 6 in the reversed order. The radiation is then directed back to the main laser cavity from beyond the light aperture of the output mirror 3 by the deflecting mirror 5. Within the main cavity, the transverse size of the injected beam then reduces on each round trip and the intensity of the radiation increases.

As the optical length of second resonator is equal or multiple to, the optical length of main laser cavity the condition of phase conjugation of injected radiation and radiation generated in the main cavity is realized. Accordingly, the injected modulated radiation effectively imposes its modulation to radiation in main laser cavity thereby ensuring a generation of high contrast pulses of high peak power at high average output power.

Figure 2:
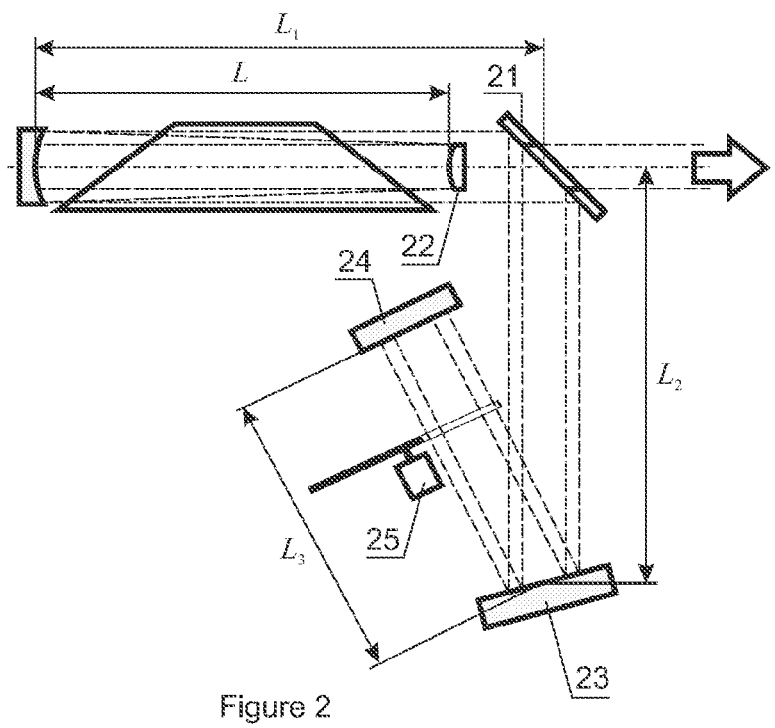
FIGS. 2 and 3 illustrate exemplary lasers where the second resonators comprise astigmatic focusing members.
Figure 3:
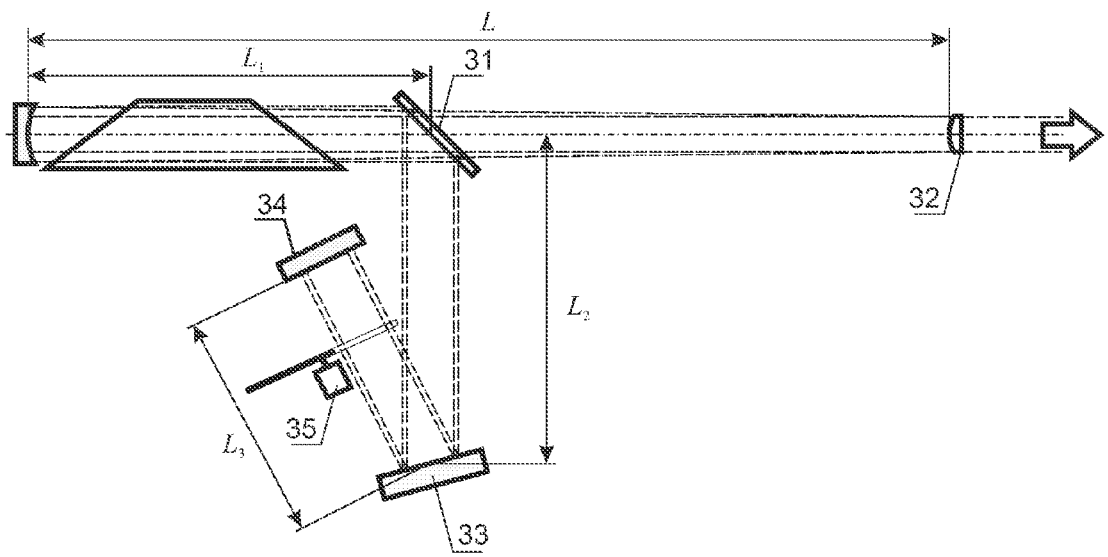

The disclosed method can also be implemented in various other ways. FIGS. 2 and 3 show examples where the second resonators comprise astigmatic focusing members.

In FIG. 2, a mirror 21 reflecting the first part of the laser beam passing by an output mirror 22 is placed outside the main cavity. In FIG. 2, the ratio between the optical length of the main cavity L and the sum of the optical distances $L_1$, $L_2$, and $L_3$ between the elements of the second resonator satisfies the condition $$L_1+L_2+L_3=kL, \quad (2)$$

where k is an integer.

Similar to that in FIG. 1, the first part of the beam, i.e. the peripheral part, propagates beyond the light aperture of the output mirror 22. The first part reflects from the deflecting mirror 21 and is directed to the second resonator of FIG. 2.

In FIG. 2, the astigmatic focusing member of the second resonator is formed by cylindrical concave mirrors 23 and 24. The transverse sizes of the beam go to minimum only in one of the transverse coordinates in the focal plane of the focusing element.

Figure 5:
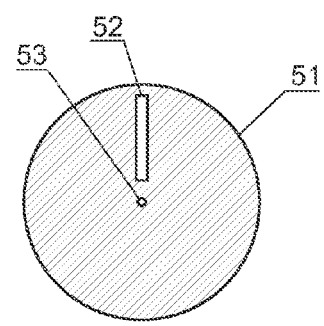

A Q-switching device 25 is placed in the focal plane of the mirror 23. The Q-switching device 25 may, for example, comprise a mechanical chopper as shown in FIG. 5. The exemplary mechanical chopper in FIG. 5 comprises a circular chopper plate 51 with a slit-shaped opening 52 through the plate 51. The plate 51 rotates around axis 53 which is perpendicular to the plane of the plate 51.

In FIG. 2, after passing through the mechanical chopper, the beam reaches the cylindrical mirror 24 of the second resonator. Similar to that in FIG. 1, the beam reflects from the rear mirror 24, passes the Q-switch 25 and the cylindrical mirror 23. The beam is then directed back to the main laser cavity by using mirror 21.

In FIG. 3, a mirror 31 reflecting the first part of the laser beam passing by an output mirror 32 is placed inside the main cavity. As in previous examples, the ratio between the optical length of the main cavity L and the sums of the optical distances $L_1$, $L_2$, and $L_3$ between the elements of the second resonator in FIG. 3 satisfy the condition of Equation (2). As in FIG. 2, the astigmatic focusing member of the second resonator in FIG. 3 is formed by cylindrical concave mirrors 33 and 34 in FIG. 3. The Q-switching device 35 may, for example, comprise a mechanical chopper as shown in FIG. 5.

It will be obvious to a person skilled in the art that the inventive concept can be implemented in various ways. The invention and its embodiments are not limited to the examples described above but may vary within the scope of the claims.

SEQUENCE LISTING

Not Applicable.

The invention claimed is:

1. A CO2 laser comprising an unstable laser cavity in the form of a first optical resonator having a semi-transparent output coupler, a laser medium in the unstable laser cavity, and means for exciting the laser medium, wherein the laser further comprises
    a second optical resonator optically coupled with the unstable laser cavity beyond the light aperture of the output coupler, wherein the second resonator comprises at least one focusing member, and wherein the optical length of the second optical resonator is equal or multiple to the optical length of first optical resonator,
    a Q-switching device arranged into the focal plane of said focusing member, and
    means for synchronizing operation of the means for exciting the laser medium with operation of the Q-switching device.

2. A laser as claimed in claim 1, wherein
    the diameter of the aperture of the output coupler is less than the diameter of a laser beam generated in the unstable laser cavity, wherein the output coupler is configured to divide the generated laser beam into a first part that follows a path passing through the aperture of the output coupler and a second part that follows a path passing by the aperture of the output coupler, and
    the second resonator is optically coupled with the unstable laser cavity by a first mirror having a hole in its aperture, wherein the first mirror of the second resonator is configured to reflect the second part of the generated laser beam.

3. A laser as claimed in claim 1, wherein magnification field factor of the unstable laser cavity is greater than 1.1, wherein the magnification field factor represents a ratio between sizes of a linear light beam in two subsequent trips in the unstable laser cavity.

4. A laser as claimed in claim 1, wherein the focusing member is astigmatic.

5. A laser as claimed in claim 4, wherein the focusing member is a cylindrical concave mirror.

6. A laser as claimed in claim 1, wherein the Q-switching device is a mechanical chopper.

7. A laser as claimed claim 1, wherein the first optical resonator has a telescopic layout.

8. A laser as claimed in claim 1, wherein the means for synchronizing control the means for exciting the laser medium on the basis of the state of the Q-switching device.

9. A method for a CO2 laser, the method comprising
    producing a laser beam in a laser cavity by exciting a laser medium in an unstable laser cavity in the form of a first optical resonator having a semi-transparent output coupler, wherein that the method further comprises
    directing a part of the laser beam propagating beyond of the light aperture of the output coupler to a second resonator, the second resonator comprising at least one focusing member, and the optical length of the second resonator being equal or multiple to the optical length of the first optical resonator,
    modulating the part of laser beam passing through the focal plane of the focusing member by using a Q-switching device in a manner that the excitation of the laser medium is in synchrony with operation of the Q-switching device.

* * * * *